United States Patent
Kwon et al.

(10) Patent No.: US 10,979,348 B1
(45) Date of Patent: Apr. 13, 2021

(54) ZERO-OVERHEAD EFFICIENT FLOODING

(71) Applicant: Rockwell Collins, Inc., Cedar Rapids, IA (US)

(72) Inventors: TJ T. Kwon, Marion, IA (US); Anthony D. Schaefer, Marion, IA (US); Naveen Rajanikantha, Marion, IA (US); Blanka Giese, Marion, IA (US); Wayne H. Meyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 13 days.

(21) Appl. No.: 16/369,398

(22) Filed: Mar. 29, 2019

(51) Int. Cl.
*H04L 12/721* (2013.01)
*H04L 12/715* (2013.01)

(52) U.S. Cl.
CPC ............ *H04L 45/32* (2013.01); *H04L 45/14* (2013.01); *H04L 45/46* (2013.01)

(58) Field of Classification Search
CPC .................................. H04L 45/14; H04L 45/32
See application file for complete search history.

(56) References Cited

U.S. PATENT DOCUMENTS

| | | | |
|---|---|---|---|
| 2006/0010170 A1* | 1/2006 | Lashley | G06F 12/0813 |
| 2011/0188378 A1* | 8/2011 | Collins | H04L 41/044 |
| | | | 370/236 |
| 2016/0150465 A1* | 5/2016 | Jung | H04W 8/005 |
| | | | 370/254 |

* cited by examiner

Primary Examiner — Angel T Brockman
(74) Attorney, Agent, or Firm — Suiter Swantz pc llo

(57) ABSTRACT

A communication node of a multi-node communication network is disclosed. The communication node includes a communication interface and a controller. The controller is configured to receive a data packet, via the communication interface, from a first additional communication node, the data packet including a broadcast address indicative of a clustering status of the first additional communication node. The controller is further configured to determine a clustering status of the communication node, the clustering status based on a relationship between a number of gateway nodes and a number of clusterhead nodes communicatively coupled to the communication node. The controller is further configured to transmit the data packet, via the communication interface, to at least a second additional communication node if the determined clustering status is a gateway clustering status or a clusterhead clustering status, the data packet including a broadcast address indicative of the clustering status of the communication node.

17 Claims, 10 Drawing Sheets

ZERO-OVERHEAD EFFICIENT FLOODING

BACKGROUND

Mobile ad-hoc networks (MANETs) are known in the art as quickly deployable, self-configuring wireless networks with no pre-defined network topology. Each communication node within a MANET is presumed to be able to move freely. Additionally, each communication node within a MANET may be required to forward (relay) data packet traffic. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. There are several types of flooding including blind flooding, multi-point relay (MPR), and efficient flooding with passive clustering (EFPC). However, each of these flooding techniques suffer from respective drawbacks.

For example, blind flooding inevitably results in unnecessary broadcasting, which results in rapidly increasing costs as the network density increases. Similarly, multi-point relay (MPR) results in increasing gain and overhead as the network density increases. With efficient flooding, the breaking of any critical communication path may result in the failure to deliver a data packet to all connected nodes. Additionally, due to the fact that EFPC utilizes dedicated two bits for packet flooding, it minimizes interoperability and may reduce the available media access control (MAC) address space.

Therefore, it would be desirable to provide a system and method that cure one or more of the shortfalls of the previous approaches identified above.

SUMMARY

A communication node of a multi-node communication network is disclosed. In one or more embodiments, the communication node includes a communication interface and a controller communicatively coupled to the communication interface. The controller is configured to receive a data packet, via the communication interface, from a first additional communication node of the multi-node communication network, the data packet including a broadcast address indicative of a clustering status of the first additional communication node. The controller is further configured to determine a clustering status of the communication node, the clustering status based on a relationship between a number of gateway nodes and a number of clusterhead nodes communicatively coupled to the communication node. The controller is further configured to transmit the data packet, via the communication interface, to at least a second additional communication node of the multi-node communication network if the determined clustering status is a gateway clustering status or a clusterhead clustering status, the data packet including a broadcast address indicative of the clustering status of the communication node.

In some embodiments of the communication node, the controller is further configured to refrain from transmitting the data packet if the determined clustering status includes an ordinary node clustering status.

In some embodiments of the communication node, the controller is further configured to determine the number of gateway nodes and the number of clusterhead nodes communicatively coupled to the communication node.

In some embodiments of the communication node, at least one of the broadcast address indicative of the clustering status of the first additional communication node or the broadcast address indicative of the clustering status of the communication node comprises a single address of a total address space of the data packet.

In some embodiments of the communication node, at least one of the broadcast address indicative of the clustering status of the first additional communication node or the broadcast address indicative of the clustering status of the communication node comprises at least one of: a first broadcast address indicative of a gateway node clustering status; a second broadcast address indicative of a clusterhead node clustering status; or a third broadcast address indicative of an ordinary node clustering status.

In some embodiments of the communication node, the controller further includes a memory configured to store a local list of one or more communication nodes communicatively coupled to the communication node.

In some embodiments of the communication node, determining a number of gateway nodes and a number of clusterhead nodes communicatively coupled to the communication node comprises counting a number of gateway nodes within the local list, and counting a number of clusterhead nodes within the local list.

In some embodiments of the communication node, the controller is further configured to: identify the first additional communication node based on a unique identifier of the first additional communication node received with the data packet from the first additional communication node; determine whether the first additional communication node is present within the local list stored in the memory; add the first additional communication node to the local list if the first additional communication node is not present within the local list; and update a clustering status and a communication time-stamp of the first additional communication node within the local list if the first additional communication node is present within the local list, wherein updating the communication time-stamp includes updating the communication time-stamp to a current time.

In some embodiments of the communication node, the unique identifier includes at least one of a media access control (MAC) address or an internet protocol (IP) address.

In some embodiments of the communication node, the controller is further configured to identify one or more timed-out communication nodes within the local list, and remove the one or more identified timed-out communication nodes from the local list.

In some embodiments of the communication node, determining the clustering status of the communication node comprises: determining an ordinary node clustering status if $GW \geq \alpha*CH+\beta$, and determining a gateway node clustering status if $GW < \alpha*CH+\beta$, wherein GW defines the determined number of gateway nodes, CH defines the determined number of clusterhead nodes, and a and define gateway redundancy factors.

A method is disclosed. In one or more embodiments, the method includes: transmitting a data packet from a first communication node of a multi-node communication network to a first set of one or more communication nodes of the multi-node communication network, the data packet including a broadcast address indicative of a clustering status of the first communication node; receiving the data packet with at least one communication node of the first set of one or more communication nodes; determining a clustering status of the at least one communication node of the first set of one or more communication nodes based on a relationship between a number of gateway nodes and a number of clusterhead nodes communicatively coupled to the at least one communication node of the first set of communication nodes; and transmitting the data packet from the at least one communication node of the first set of communication nodes to a second set of one or more communication nodes in the multi-node communication network if the determined clustering status comprises a gateway clustering status or a clusterhead clustering status, the data packet including a broadcast address indicative of a clustering status of the at least one communication node of the first set of communication nodes.

In some embodiments of the method, at least one of the broadcast address indicative of the clustering status of the first additional communication node or the broadcast address indicative of the clustering status of the communication node comprises a single address of a total address space of the data packet.

In some embodiments of the method, at least one of the broadcast address indicative of the clustering status of the first additional communication node or the broadcast address indicative of the clustering status of the communication node comprises at least one of: a first broadcast address indicative of a gateway node clustering status; a second broadcast address indicative of a clusterhead node clustering status; or a third broadcast address indicative of an ordinary node clustering status.

In some embodiments of the method, determining a number of gateway nodes and a number of clusterhead nodes communicatively coupled to the communication node comprises counting a number of gateway nodes within the local list, and counting a number of clusterhead nodes within the local list.

In some embodiments of the method, the method further includes identifying one or more timed-out communication nodes within the local list, and removing the one or more identified timed-out communication nodes from the local list.

In some embodiments of the method, the method further includes: identifying the first additional communication node based on a unique identifier of the first additional communication node received with the data packet from the first additional communication node; determining whether the first additional communication node is present within the local list stored in the memory; adding the first additional communication node to the local list if the first additional communication node is not present within the local list; and updating a clustering status and a communication time-stamp of the first additional communication node within the local list if the first additional communication node is present within the local list, wherein updating the communication time-stamp includes updating the communication time-stamp to a current time.

In some embodiments of the method, the unique identifier includes at least one of a media access control (MAC) address, an internet protocol (IP) address, or the like.

In some embodiments of the method, determining the clustering status of the communication node comprises: determining an ordinary node clustering status if $GW \geq \alpha*CH+\beta$, and determining a gateway node clustering status if $GW < \alpha*CH+\beta$, wherein GW defines the determined number of gateway nodes, CH defines the determined number of clusterhead nodes, and $\alpha$ and $\beta$ define gateway redundancy factors.

A multi-node communication network is disclosed. In one or more embodiments, the multi-node network includes a plurality of communication nodes. A communication node of the plurality of communication nodes includes a communication interface and a controller. The controller may be configured to receive a data packet, via the communication interface, from a first additional communication node of the multi-node communication network, the data packet including a broadcast address indicative of a clustering status of the first additional communication node. The controller may be further configured to determine a clustering status of the communication node. The controller may be further configured to transmit the data packet, via the communication interface, to at least a second additional communication node of the multi-node communication network, the data packet including a broadcast address indicative of the clustering status of the communication node;

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
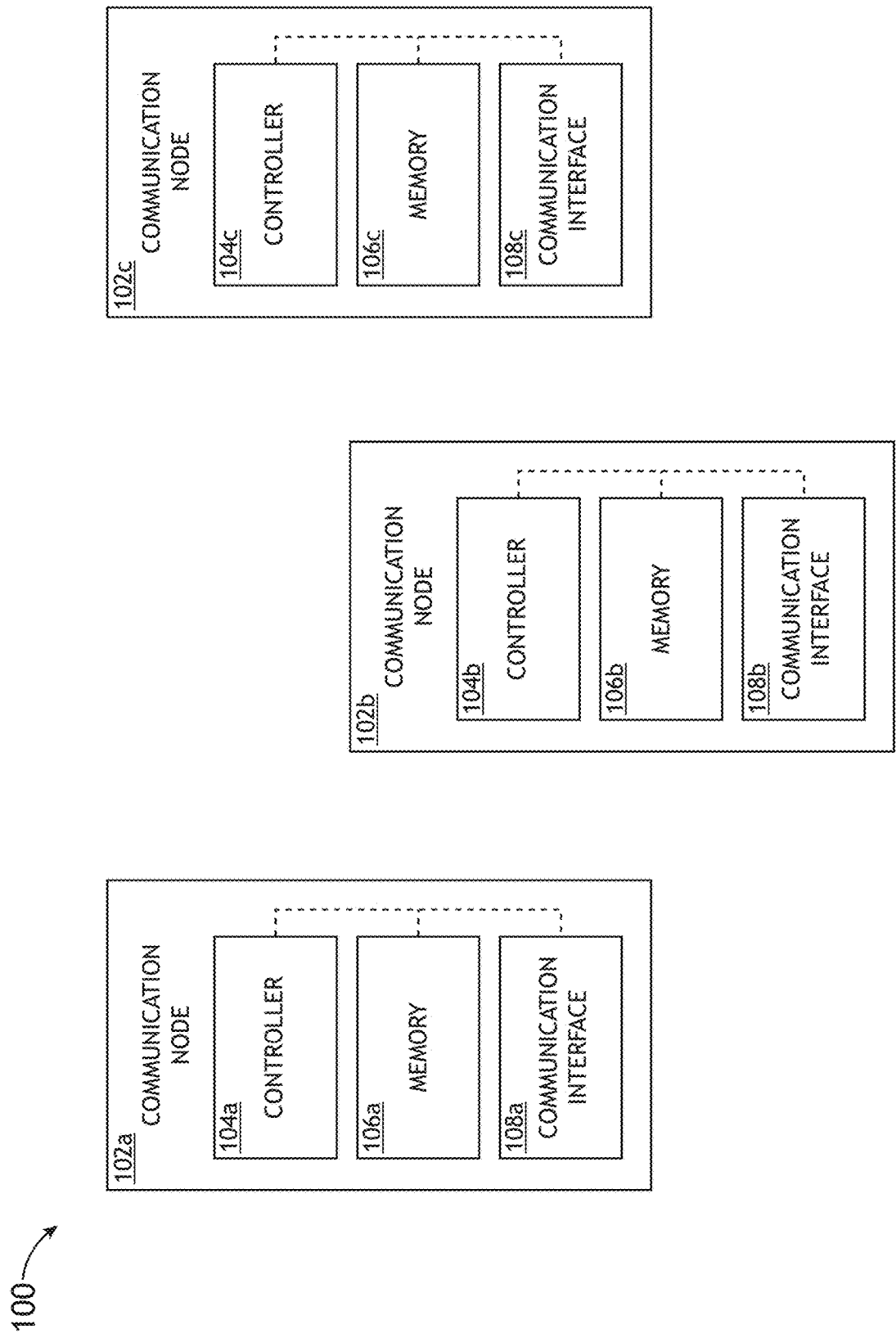
FIG. 1 illustrates a multi-node communication network, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Mobile ad-hoc networks (MANETs) are known in the art as quickly deployable, self-configuring wireless networks with no pre-defined network topology. Each communication node within a MANET is presumed to be able to move freely and independently. Additionally, each communication node within a MANET may be required to forward (relay) data packet traffic. In this regard, each node within a MANET may be regarded as a router. Data packet routing and delivery within a MANET may depend on a number of factors including, but not limited to, the number of communication nodes within the network, communication node proximity and mobility, power requirements, network bandwidth, user traffic requirements, timing requirements, and the like.

Currently, packet flooding is one of the only techniques which may be used to deliver a data packet to a particular destination without knowing the route or network topology. There are several types of flooding including blind flooding, multi-point relay (MPR), and efficient flooding with passive clustering (EFPC). However, each of these flooding techniques suffer from respective drawbacks.

Through blind flooding, a flooding packet is broadcast by each communication node at most once. The communication nodes are configured to remember earlier flooding packet history with packet identifiers, such as source internet protocol (IP) addresses, media access control (MAC) addresses, sequence numbers, and the like. In this regard, blind flooding may include the largest control overhead for many MANET protocols. Blind flooding may be utilized to discover routes through a multi-node communication network, and to distribute routing information to communication nodes within the network. It is noted herein that, without the bookkeeping to prevent a communication node from transmitting a flooding packet repeatedly, a single flooding may result in large amounts of unnecessary broadcasting, and consume all bandwidth within the network. Additionally, blind flooding may result in unnecessary broadcasting, which results in rapidly increasing costs as the network density increases.

In MPR, communication nodes within a multi-node communication network identify and learn their two-hop neighbors through a series of "Hello" messages, which carry a list of their direct, one-hop neighbors (e.g., "neighbor list"). The communication nodes are then configured to select a subset of their respective one-hop neighbors such that subset of the one-hop neighbors will be able to deliver data packets to each respective two-hop neighbor. Selection heuristics may be used to avoid set-cover issues. However, it is noted herein that MPR techniques result in increasing gain and overhead as the network density increases. Additionally, selection mechanism utilizing neighbor lists take time, which may lead to delays within the system. Furthermore, the neighbor lists utilized in MPR may be dated and incomplete, leading to increased probabilities that communication with critical nodes will be omitted and/or excluded. Thus, MPR techniques are often ill-suited for dense multi-node communication networks.

In comparison, efficient flooding with passive clustering (EFPC) is often used due to the fact that EFPC techniques do not require any prior knowledge of network topology, or even neighboring lists. EFPC and other efficient flooding techniques may be used for on-the-fly deployment of a two-hop clustering structure, and may be advantageous in that the very first flooding may be as efficient as subsequent flooding. However, with EFPC, two bits of each MAC packet are dedicated to clustering state information of each communication node. Due to the fact that EFPC utilizes dedicated two bits for efficient flooding, EFPC reduces available address space, breaks interoperability, and may not implementable without breaking communication protocol. t minimizes interoperability and may reduce the available address space.

Accordingly, embodiments of the present disclosure are directed at curing one or more of the shortfalls of previous approaches identified above. Broadly, embodiments of the present disclosure are directed to a system and method for zero-overhead efficient flooding (ZOEF). More specifically, embodiments of the present disclosure are directed to a system and method for data packet flooding and passive clustering without the use of dedicated two-bits for clustering state data. Additional embodiments of the present disclosure are directed to the use of multiple designated broadcast addresses for various types of communication nodes within a multi-node communication network. Additional embodiments of the present disclosure are directed to system and method for data packet flooding and passive clustering which utilizes a broadcast address comprising a single address of a total address space of a data packet. Further embodiments of the present disclosure are directed to a system and method of efficient packet flooding which provides all the benefits of EFPC while preserving interoperability.

FIG. 1 illustrates a multi-node communication network 100, in accordance with an example embodiment of the present disclosure. In embodiments, the multi-node communication network 100 may include a plurality of communication nodes 102. For example, the multi-node communication network 100 may include a first communication node 102a, a second communication node 102b, and a third communication node 102c.

The multi-node communication network 100 may include any multi-node communication network known in the art. For example, the multi-node communication network 100 may include a mobile ad-hoc network (MANET) in which each communication node 102 within the multi-node communication network is able to move freely and independently. Similarly, the one or more communication nodes 102 may include any communication node known in the art which may be communicatively coupled. In this regard, the one or more communication nodes 102 may include any communication node known in the art for transmitting/transceiving data packets. For example, the one or more communication nodes 102 may include, but are not limited to, radios, mobile phones, smart phones, tablets, smart watches, laptops, and the like.

Each communication node 102 of the one or more communication nodes 102a, 102b, 102c may include, but is not limited to, a respective controller 104 (e.g., controller 104a, 104b, 104c, etc.), memory 106 (e.g., memory 106a, 106b, 106c, etc.), and communication interface 108 (e.g., communication interface 108a, 108b, 108c, etc.).

The controller 104 provides processing functionality for at least the communication node 102 and can include any number of processors, micro-controllers, circuitry, field programmable gate array (FPGA) or other processing systems, and resident or external memory for storing data, executable code, and other information accessed or generated by the communication node 102. The controller 104 can execute one or more software programs embodied in a non-transitory computer readable medium (e.g., memory 106) that implement techniques described herein. The controller 104 is not limited by the materials from which it is formed or the processing mechanisms employed therein and, as such, can be implemented via semiconductor(s) and/or transistors (e.g., using electronic integrated circuit (IC) components), and so forth.

The memory 106 can be an example of tangible, computer-readable storage medium that provides storage functionality to store various data and/or program code associated with operation of the communication node 102/controller 104, such as software programs and/or code segments, or other data to instruct the controller 104, and possibly other components of the communication node 102, to perform the functionality described herein. Thus, the memory 106 can store data, such as a program of instructions for operating the communication node 102, including its components (e.g., controller 104, communication interface 108, etc.), and so forth. It should be noted that while a single memory 106 is described, a wide variety of types and combinations of memory (e.g., tangible, non-transitory memory) can be employed. The memory 106 can be integral with the controller 104, can comprise stand-alone memory, or can be a combination of both. Some examples of the memory 106 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 108 can be operatively configured to communicate with components of the communication node 102. For example, the communication interface 108 can be configured to retrieve data from the controller 104 or other devices (e.g., other nodes 102), transmit data for storage in the memory 106, retrieve data from storage in the memory 106, and so forth. The communication interface 108 can also be communicatively coupled with the controller 104 to facilitate data transfer between components of the communication node 102 and the controller 104. It should be noted that while the communication interface 108 is described as a component of the communication node 102, one or more components of the communication interface 108 can be implemented as external components communicatively coupled to the communication node 102 via a wired and/or wireless connection. The communication node 102 can also include and/or connect to one or more input/output (I/O) devices. In embodiments, the communication interface 108 includes or is coupled to a transmitter, receiver, transceiver, physical connection interface, or any combination thereof.

It is contemplated herein that the communication interface 108 of a communication node 102 may be configured to communicatively couple to additional communication interfaces 108 of additional communication nodes 102 of the multi-node communication network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the controller 104 of a communication node 102 is configured to carry out various steps and functions of the present disclosure. The controller may be configured to: receive a data packet, via the communication interface, from a first communication node of the multi-node communication network; determine a number of gateway nodes and a number of clusterhead nodes communicatively coupled to the communication node; determine a clustering status of the communication node, the clustering status based on a relationship between the determined number of gateway nodes and the determined number of clusterhead nodes; and transmit the data packet, via the communication interface, to at least one additional communication node of the multi-node communication network if the determined clustering status is a gateway clustering status or a clusterhead clustering status. Each of these steps may be addressed in turn.

In embodiments, a controller 104 of a communication node 102 of a multi-node communication network 100 is configured to receive a data packet transmitted by an additional communication node 102 within the multi-node communication network 100. For example, the first communication node 102a may transmit a data packet to the second communication node 102b. The controller 104b of the second communication node 102b may then be configured to receive the data packet from the communication interface 108b.

Communication nodes 102 of the multi-node communication network 100 may be "clustered" or otherwise identified according to a plurality of clustering statuses. For example, a communication node 102 may be classified, clustered, or otherwise identified according to a clustering status including an "initial node" clustering status, an "ordinary node" clustering status, a "gateway node" clustering status, or a "clusterhead node" clustering status. In this regard, each communication node 102 of the multi-node communication network 100 may be identified according to a respective clustering status. According to embodiments of the present disclosure, a first clusterhead node may not be directly communicatively coupled to an additional clusterhead node (e.g., a first clusterhead node may not be one-hop neighbors with an additional clusterhead node). In further embodiments, ordinary nodes within the multi-node communication network 100 may be capable of initiating flooding, but may be discouraged, prevented, or may otherwise refrain from, relaying and/or re-transmitting flooding data packets. Differences between communication nodes 102 of varying clustering statuses will be discussed in further detail herein.

In embodiments, data packets transmitted by communication nodes 102 within the multi-node communication network 100 may include a broadcast address indicative of the clustering status of the transmitting node. The broadcast addresses may be included within the header of a transmitted data packet. For example, the data packet transmitted by the first communication node 102a to the second communication node 102b may include a header which includes a broadcast address of the first communication node 102a, wherein the broadcast address is indicative of the clustering status of the first communication node 102a.

The multi-node communication network 100 may utilize multiple broadcast addresses in order to identify the clustering status of each respective transmitting communication node 102. A first broadcast address may be indicative of a gateway node clustering status, a second broadcast address may be indicative of a clusterhead node clustering status, and a third broadcast address may be indicative of an ordinary node clustering status. For example, in embodiments, the broadcast address of a gateway node may include the legacy broadcast address (LBA), such as FF address in a hexadecimal system. For example, in additional embodiments, the broadcast address of an ordinary node may include the legacy broadcast address (LBA) minus a value (LBA-A), such as FE address in a hexadecimal system. For example, in additional embodiments, the broadcast address of a clusterhead node may include the legacy broadcast address (LBA) minus a value (LBA-B), such as FD address in a hexadecimal system. It is noted herein that these broadcast addresses are provided merely for illustration, and are not to be regarded as a limitation of the present disclosure, unless noted otherwise herein. Furthermore, it is contemplated herein that the destination addresses of data packets transmitted within the multi-node communication network 100 may include any-MAC address, such that the communication nodes 102 may be configured to carry out anycasting (e.g., unicasting/multicasting) for purposes of flooding. It is contemplated herein that destination addresses may include any unique identifier configured to identify an intended communication node 102 including, but not limited to, MAC address, IP address, a single byte address, and the like.

It is noted herein that using single broadcast addresses to identify the clustering status of a transmitting communication node 102 may provide a number of advantages over previous approaches. By using specified broadcasting packets, the multi-node communication network 100 may be configured to use only the broadcasting packets to denote clustering status, as opposed to EFPC, which utilizes all transmitted packets for passive clustering. It is contemplated herein that implementing passive clustering without the use of dedicated two bits, such as is the case with EFPC, embodiments of the present disclosure may inherit all of the benefits provided by EFPC, while simultaneously improving interoperability and increasing address space within data packets.

As noted previously herein, EFPC utilizes dedicated two bits for passive clustering, one bit from the source address, and one bit for the destination address, if the two dedicated bits are from the address. Additionally EFPC utilizes a single broadcast address. Typically there are not two un-used bits in a data communication waveform. By using two bits of a MAC address field (e.g., one bit from the source address, and one bit for the destination address), it effectively reduces the address space in half, and reduces the number of communication nodes 102 which may be included within the multi-node communication network 100. In addition, taking away bits from address field may break the standard operation of a protocol. In this regard, by using specified broadcasting packets to implement passive clustering, embodiments of the present disclosure may dramatically increase the available address space within a system.

For example, consider a one-byte MAC address. A one-byte MAC address, whether in a binary system or a hexadecimal system, includes 256 MAC address spaces (e.g., binary $2^8$=256, hexadecimal $16^2$=256). By using a dedicated two bits for passive clustering (one bit from the source address, and one bit for the destination address), EFPC effectively reduces the available MAC address space in half. For instance, in a binary system, one dedicated bit within a destination address (two dedicated bits total) would reduce the MAC address in half (e.g., $2^7$=128). Additionally, because EFPC utilizes a single broadcast address, the available MAC address space using a one-byte MAC address and EFPC techniques would result in a total MAC address space of 127 (e.g., 128 addresses−1 broadcast address=127 MAC addresses).

Comparatively, consider the same one-byte MAC address. Instead of using a dedicated two bits and a single broadcast address, the multi-node communication network 100 of the present disclosure may use a single broadcast address in order to implement passive clustering. In embodiments, the single broadcast address in a data packet may include one of three separate broadcast addresses. For example, a first broadcast address may be indicative of a gateway node clustering status, a second broadcast address may be indicative of a clusterhead node clustering status, and a third broadcast address may be indicative of an ordinary node clustering status. For instance, a gateway node within the multi-node communication network 100 may transmit data packets including a single broadcast address indicative of a gateway node clustering status, a clusterhead node within the multi-node communication network 100 may transmit data packets including a single broadcast address indicative of a clusterhead node clustering status, and the like. In this regard, the total available MAC address space using a one-byte MAC address with the system and method of the present disclosure would result in a total MAC address space of 256 (e.g., 1 byte=256 addresses−3 broadcast address=253 MAC addresses).

It should be noted herein that it is assumed that the number of communication nodes 102 within the multi-node communication network must be less than the total address space minus three. For example, with one-byte MAC addresses, the total amount of communication nodes 102 which may be supported within the multi-node communication network 100 would be 253 communication nodes 102 (e.g., 256 addresses−3 broadcast address=253 MAC addresses). Additionally, it must also be assumed that the multi-node communication network 100 may be configured to handle multiple broadcast addresses (e.g., three broadcast addresses). Because the system and method of the present disclosure and EFPC are not routing protocols, but rather flooding efficiency enhancement mechanisms, a routing protocol on Layer 3 or Layer 2 is needed to enable end-to-end communication. Furthermore, the address savings and flooding efficiency enhancement provided by the system and method of the present disclosure may be based on the assumption that operations in legacy environments/systems require Layer 3 for routing determination.

In addition to significant address availability savings, the system and method of the present disclosure may provide for zero network overhead when implementing passive clustering. The system and method of the present disclosure implement passive clustering via the use of separate broadcast packets. Due to the fact that previous approaches were already required to process broadcasting packets (in addition to the two dedicated bits), the implementation of passive clustering within the broadcasting packets does not increase the overhead within the system. In this regard, due to the fact that processing broadcasting packets was already required, the system and method of the present disclosure may be configured to provide for zero-overhead efficient flooding (ZOEF).

In embodiments, a controller 104 of a communication node 102 of a multi-node communication network 100 is configured to determine a number of gateway nodes and a number of clusterhead nodes communicatively coupled to the communication node 102. For example, upon receiving the data packet from the first communication node 102a, the second communication node 102b may be configured to determine the number of gateway nodes and the number of clusterhead nodes communicatively coupled to it.

In embodiments, the controller 104 of the communication node 102 is configured to determine the number of gateway nodes and the number of communication nodes communicatively coupled to the communication node 102 by referencing a local list stored in the memory 106 of the communication node. In this regard, the memory 106b of the communication node 102b may be configured to store a local list of one or more communication nodes 102 communicatively coupled to the communication node 102b. For the purposes of simplicity, the term "communication nodes communicatively coupled to communication node 102b" may be used interchangeably with the term "neighboring communication nodes." In embodiments, the local list of communication nodes 102 may include various pieces of information regarding the neighboring nodes of communication node 102b. For example, the local list may include, but is not limited to, MAC addresses of neighboring nodes, internet protocol (IP) addresses of neighboring nodes, clustering statuses of neighboring nodes, time-stamps indicating the time of the last communication with each respective neighboring node, and the like.

In some embodiments, the controller 104 of communication node 102 may be configured to determine a number of gateway nodes communicatively coupled to the communication node 102 (e.g., number of neighboring gateway nodes) by counting the number of gateway nodes within the local list. Similarly, the controller 104 of communication node 102 may be configured to determine a number of clusterhead nodes communicatively coupled to the communication node 102 (e.g., number of neighboring clusterhead nodes) by counting the number of clusterhead nodes within the local list. The controller 104 may use any sorting, filtering, or searching algorithms known in the art to identify and/or count the number of gateway/clusterhead nodes within the local list.

In the event a communication node 102 is not present within the local list, the controller 104 may be configured to add the communication node to the local list. For example, the first communication node 104a may transmit a data packet to the second communication node 102b. Upon receiving the data packet, the controller 104b of the second communication node 102b may search the local list stored in memory 106b and determine that the first communication node 102a is not included within the local list. This may be due to the addition of new communication nodes 102 into the network, communication nodes 102 moving in and out of range from one another, and the like. The controller 104 may identify that the first communication node 102a is not included in the local list by comparing a unique identifier (e.g., MAC address, IP address, or the like) of the first communication node 102a within the data packet to unique identifiers (e.g., MAC addresses, IP addresses, or the like) of neighboring nodes in the local list. Continuing with the same example, upon determining that the first communication node 102a is not present within the local list, the controller 104 may be configured to add the first communication node 102a to the local list.

Conversely, in the event a communication node 102 is present within the local list, the controller 104 may be configured to update the clustering status and communication time-stamp of the communication node 102 within the local list. For example, the first communication node 104a may transmit a data packet to the second communication node 102b. Upon receiving the data packet, the controller 104b of the second communication node 102b may search the local list stored in memory 106b and determine that the first communication node 102a is included within the local list. Upon determining that the first communication node 102a is present within the local list, the controller 104 may be configured to update the clustering status of the first communication node 102a within the local list to the clustering status determined by the broadcast address indicative of the clustering status within the data packet. Due to the fact that the local list may be updated on a regular, irregular, or intermittent basis, the clustering status of each communication node 102 may be regarded as a "soft state."

Additionally, the controller 104 may be configured to update the communication time-stamp of the first communication node 102a to the time the data packet was received (e.g., the current time). By updating the communication time-stamp of the first communication node 102a to the current time, the local list then shows that the first communication node 102a was recently communicatively coupled to the second communication node 102b. Additionally, by updating the communication time-stamp of the first communication node 102a to the current time, the time-out period for the first communication node 102a would effectively be reset.

Furthermore, the controller 104 may be configured to identify and remove one or more timed-out communication nodes 102 within the local list. In embodiments, a first communication node 102a which has timed-out and been removed from a local list of a second communication node 102b may be regarded as no longer being communicatively coupled to the second communication node 102b. As it is used herein, the term "timed-out" refers to a communication node 102a which was last communicatively coupled to a communication node 102b at a past time which is greater than a time-out threshold. The time-out threshold may be set automatically by the multi-node communication netwrok 100, manually by a user via a communication node 102, or the like. It is contemplated herein that the time-out threshold may be set and/or adjusted based on any number of factors including, but not limited to, the number of communication nodes 102 within the multi-node communication network 100, the density of the multi-node communication network 100, the sensitivity of information transmitted in multi-node communication network 100, and the like.

For example, if a communication time-stamp for the first communication node 102a indicates that the first communication node 102a and the second communication node 102b were most recently communicatively coupled at a time in the past which is greater than the time-out threshold, the controller 104b of the second communication node 102b may identify the first communication node 102a as a timed-out communication node 102, with respect to the second communication node 102b. In embodiments, upon identifying one or more timed-out communication nodes 102 in the local list, the controller 104 may be configure to remove (e.g., delete) the one or more timed-out communication nodes 102 from the local list.

It should be noted herein that, in practice, the controller 104 may be configured to identify and remove one or more timed-out communication nodes 102 from the local list prior to determining the number of neighboring gateway nodes and the number of neighboring clusterhead nodes. By removing timed-out communication nodes first, the controller 104 may ensure the list of communication nodes 102 within the local list is accurate and "fresh," and may thereby more accurately determine the number of neighboring gateway/clusterhead nodes.

In embodiments, clusterhead nodes may not be neighbors with other clusterhead nodes. In this regard, two clusterhead nodes may not be directly communicatively coupled to one another such that they make up "one-hop" neighbors. Therefore, a communication node 102 in clusterhead clustering state may not include a list of clusterhead nodes within the local list stored in memory 106.

In embodiments, the controller 104 may be further configured to determine a clustering status of the communication node 102. For example, upon receiving the data packet from the first communication node 102a, the controller 104b of the second communication node 102b may be configured to determine the clustering status of the second communication node 102b. In some embodiments, the clustering status of the communication node may be determined based on a relationship between the determined number of gateway nodes and the determined number of clusterhead nodes.

For example, if the determined number of the clustering status of a communication node 102 (e.g., second communication node 102b) may be determined according to Equation 1 and Equation 2.

$$GW \geq \alpha * CH + \beta \quad (1)$$

$$GW < \alpha * CH + \beta \quad (2)$$

wherein GW defines the determined number of gateway nodes, CH defines the determined number of clusterhead nodes, and α and β define gateway redundancy factors. In embodiment, if Equation 1 is found to be true, a controller 104 may be configured to determine the clustering status of the communication node 102 to be an ordinary node clustering status. Conversely, if Equation 2 is found to be true, a controller 104 may be configured to determine the clustering status of the communication node 102 to be a gateway node clustering status.

An example may prove to be illustrative. For the purposes of this example, the gateway redundancy factors α and β may both be defined to equal one. In this example, the controller 104b of the second communication node 102b may search the local list stored in memory 106b to determine the number of neighboring gateway nodes is three (e.g., GW=3) and the number of neighboring clusterhead nodes equals one (e.g., CH=1). In this example, the controller 104b may determine that Equation 1 is true (GW≥α*CH+β: 3≥2). Accordingly, the controller 104b may determine the clustering status of the second communication node 102b to be an ordinary node clustering status.

Consider another example in which the gateway redundancy factors α and β may both be defined to equal one. In this example, the controller 104b of the second communication node 102b may search the local list stored in memory 106b to determine the number of neighboring gateway nodes is three (e.g., GW=3) and the number of neighboring clusterhead nodes equals three (e.g., CH=3). In this example, the controller 104b may determine that Equation 2 is true (GW<α*CH+β: 3<4). Accordingly, the controller 104b may determine the clustering status of the second communication node 102b to be a gateway node clustering status.

In embodiments, the controller 104 of a communication node 102 is configured to transmit (or not transmit) the received data packet depending on the determined clustering status of the communication node. In this regard, communication nodes 102 within the multi-node communication network 100 may be regarded as routers configured to "relay" received data packets. For example, in embodiments, the controller 104 may be configured to cause the communication interface 108 of the communication node 102 to transmit the received data packet to one or more additional communication nodes 102 if the determined clustering status of the communication node is a gateway clustering status or a clusterhead clustering status. Conversely, the controller 104 may be configured to stop, prohibit, or otherwise refrain from transmitting the received data packet if the determined clustering status of the communication node is an ordinary node clustering status.

As noted previously herein, data packets transmitted by communication nodes 102 within the multi-node communication network 100 may include a broadcast address indicative of the clustering status of the transmitting node. Data packets may additionally include the MAC address of the transmitting communication node 102. In this regard, the data packets relayed by a clusterhead node and/or a gateway node may include both the MAC address of the respective transmitting node, and a broadcast address indicative of the clustering status of the transmitting node.

In traditional flooding approaches, all nodes, including ordinary nodes, participate in flooding. Conversely, by refraining from transmitting a received data packet if the determined clustering status of a communication node 102 is an ordinary node clustering status, ordinary nodes within the multi-node communication network 100 are effectively estopped from participating in flooding. It is contemplated herein that this non-participation of ordinary nodes in flooding procedures may allow for improved flooding efficiency on the fly, while not degrading the delivery ratio. Additionally, by preventing ordinary nodes from participating in flooding, unnecessary and duplicative data transmissions may be reduced, thereby increasing the available bandwidth within the multi-node communication network 100.

In embodiments, the gateway redundancy factors $\alpha$ and $\beta$ in Equation 1 and Equation 2 may be manually and/or automatically adjusted to control the number and density of gateway nodes (and therefore number of ordinary nodes) within the multi-node communication network 100. Although the examples provided herein provide for gateway redundancy factors which are equal (e.g., $\alpha=\beta$), it is noted herein that the gateway redundancy factors $\alpha$ and $\beta$ need not be equal. Adjusting the gateway redundancy factors $\alpha$ and $\beta$ may alter the ratio of gateway communication nodes and ordinary communication nodes, which may affect the density of data transmission throughout the multi-node communication network 100. By adjusting the ratio of gateway nodes to ordinary nodes within the multi-node communication network 100, the network may be tailored according to a number of factors including, but not limited to, importance of data delivery, delay requirements, bandwidth requirements, number of communication nodes 102, density of communication nodes 102, and the like.

Embodiments of the present disclosure may provide a number of advantages over previous approaches. First, the system and method of the present disclosure may provide for on-the-fly efficiency enhancements and network structuring, with no wait time. Because communication nodes 102 may effectively alter their own clustering status each time a data packet is received, the communication nodes 102 within the multi-node communication network 100 may effectively alter the passive clustering make-up of the multi-node communication network 100, and thereby provide for on-the-fly efficiency enhancements. Additionally, the system and method of the present disclosure provide for passive clustering with zero-overhead (e.g., Zero Overhead Efficient Flooding). Furthermore, the multi-node communication network 100 may allow for pseudo power control effects.

It is noted herein that preventing ordinary nodes from participating in flooding may, in some instances, result in slightly longer data transmission paths, and therefore slightly longer delays. Additionally, there may be potential for data transmission bottlenecks. However, these drawbacks are negligible as compared to the numerous advantages provided by the system and method of the present disclosure. Furthermore, the severity and/or existence of these drawbacks may be alleviated and/or eliminated by adjusting the gateway redundancy factors $\alpha$ and $\beta$. For example, the gateway redundancy factors $\alpha$ and $\beta$ may be adjusted such that no ordinary nodes are present within the multi-node communication network 100. In this example, the multi-node communication network 100 may function in the same manner as previous approaches identified herein.

Figure 2A:
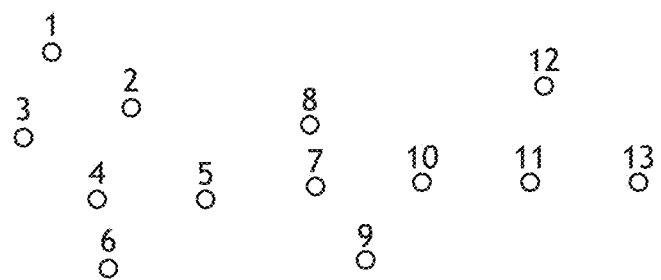
FIG. 2A illustrates a multi-node communication network, in accordance with one or more embodiments of the present disclosure.

FIG. 2A illustrates a multi-node communication network, in accordance with one or more embodiments of the present disclosure. As may be seen in FIG. 2A, the multi-node communication network may include a plurality of communication nodes.

Figure 2B:
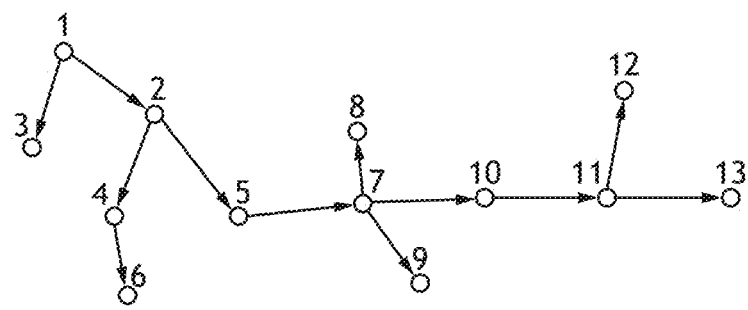
FIG. 2B illustrates data transmittal pathways through a multi-node communication network utilizing an ad hoc on-demand distance vector routing (AODV) communication protocol.
Figure 2C:
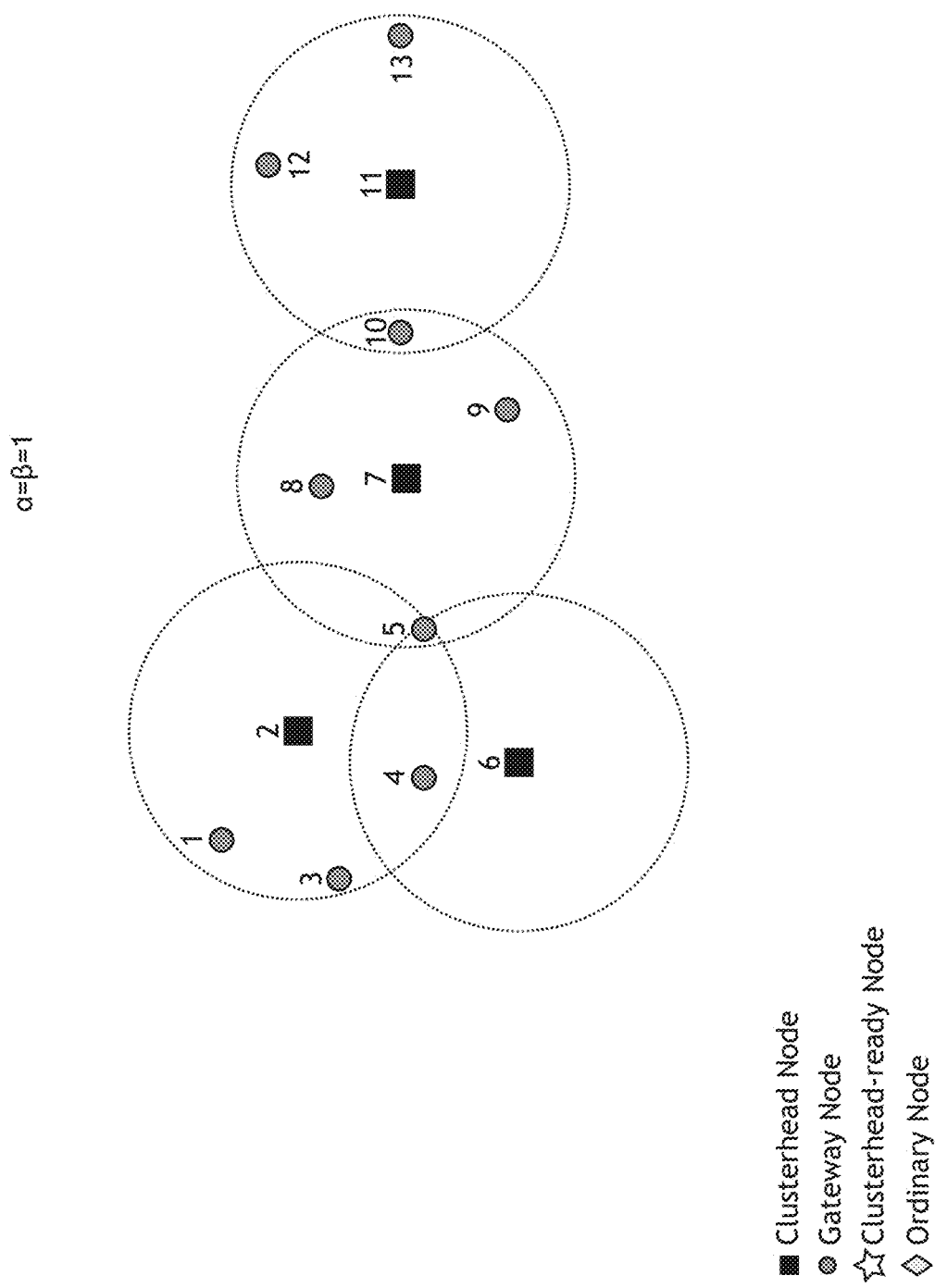
FIG. 2C illustrates a resulting clustering of a multi-node communication network utilizing an ad hoc on-demand distance vector routing (AODV) communication protocol.

FIG. 2B illustrates data transmittal pathways through a multi-node communication network utilizing an ad hoc on-demand distance vector routing (AODV) communication protocol. FIG. 2C illustrates a resulting clustering of a multi-node communication network utilizing an ad hoc on-demand distance vector routing (AODV) communication protocol.

As may be seen in FIG. 2C, using AODV, Node 2, Node 6, Node 7, and Node 11 may include clusterhead node clustering statuses in the resulting clustering, while the remaining nodes include gateway clustering statuses in the resulting clustering. The resulting clustering from AODV illustrated in FIG. 2C may be compared to resulting clusterings from EFPC and ZOEF, as will be described in further detail herein.

Figure 3:
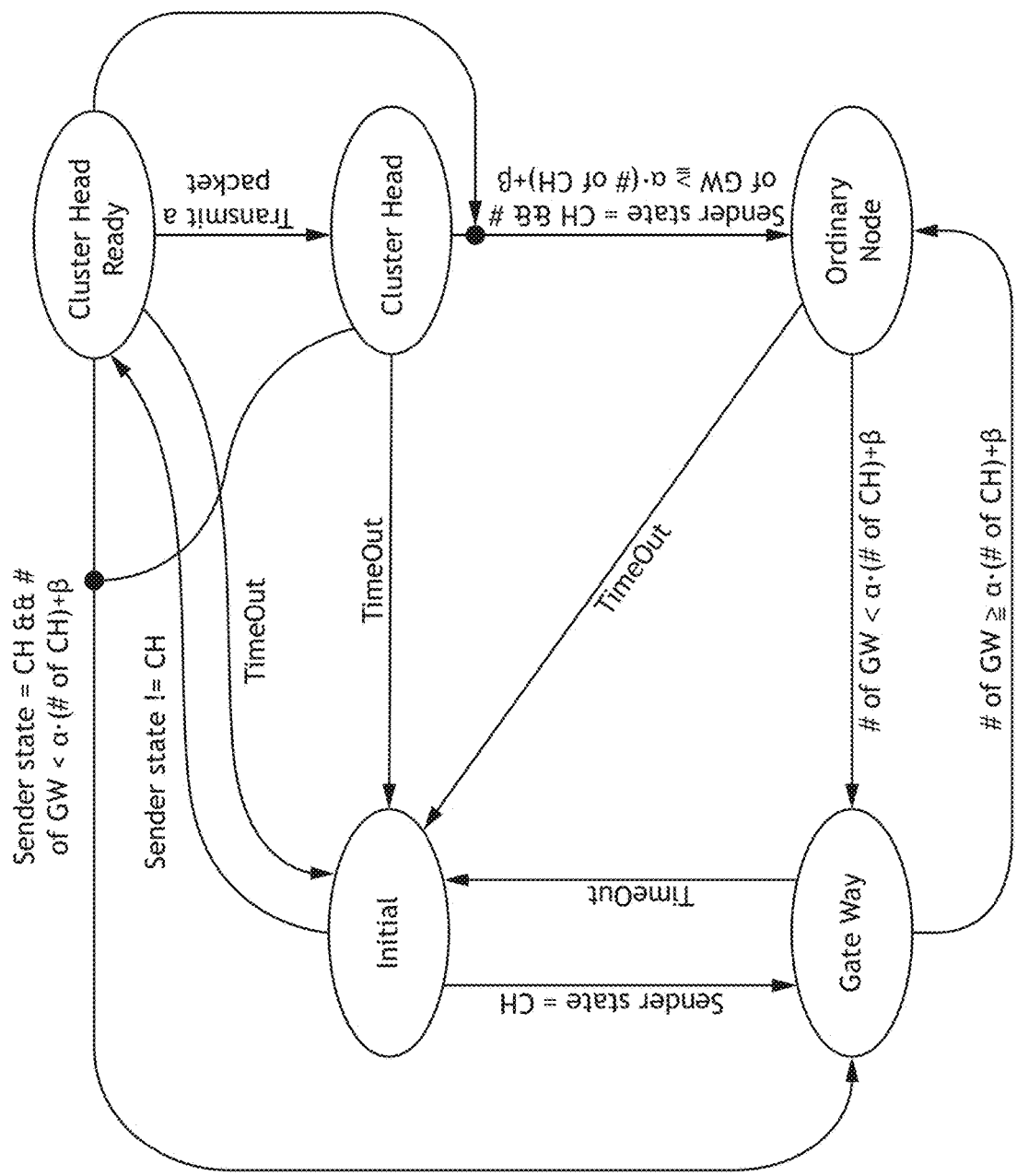
FIG. 3 illustrates a clustering state transition diagram for efficient flooding with passive flooding (EFPC).

FIG. 3 illustrates a clustering state transition diagram for efficient flooding with passive flooding (EFPC).

As noted previously herein, passive clustering may be used to cluster communication nodes 102 into multiple clustering statuses. As shown in FIG. 3, EFPC may include five separate clustering statuses: an "initial node" clustering status, a "clusterhead-ready" clustering status, an "ordinary node" clustering status, a "gateway node" clustering status, and a "clusterhead node" clustering status. With EFPC, each node may start out with an initial node clustering status. Upon receiving a data packet from a communication node other than a clusterhead node, an initial node may transition to a clusterhead-ready node. Conversely, upon receiving a data packet from a clusterhead node, an initial node may transition to a gateway node. Additionally, clusterhead-ready nodes, clusterhead nodes, ordinary nodes, and gateway nodes may all revert back to an initial node if all the clusterhead nodes within the local list of the respective nodes are timed-out. For example, a gateway node may revert back to an initial node if all the clusterhead nodes within the local list of the gateway node are timed-out.

When a clusterhead-ready node obtains and transmits a packet, it may declare its status as a clusterhead node and transition into a clusterhead node. Additionally, upon receiving a data packet from a clusterhead node, a clusterhead-ready node may transition to a gateway node if $GW<\alpha*CH+\beta$. Conversely, upon receiving a data packet from a clusterhead node, a clusterhead-ready node may transition to an ordinary node if $GW\geq\alpha*CH+\beta$.

A clusterhead node may transition to a gateway node upon receiving a data packet from another clusterhead node if $GW<\alpha*CH+\beta$. Conversely, a clusterhead node may transition to an ordinary node upon receiving a data packet from another clusterhead node if $GW\geq\alpha*CH+\beta$. A gateway node may transition to an ordinary node upon receiving a data packet if the gateway node determines $GW\geq\alpha*CH+\beta$. Conversely, upon receiving a data packet, an ordinary node may transition to a gateway node if the ordinary node determines $GW<\alpha*CH+\beta$.

Figure 4A:
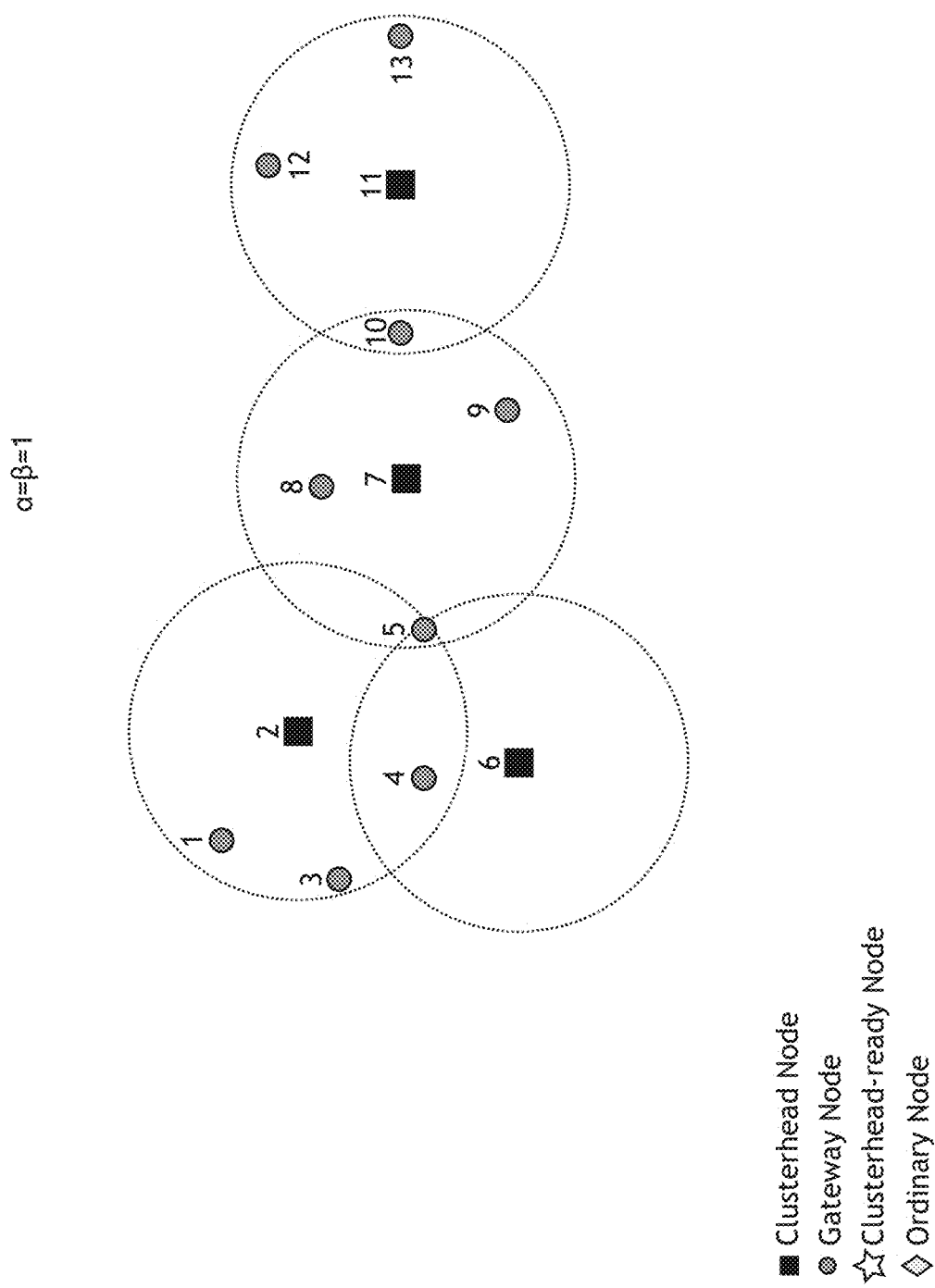
FIG. 4A illustrates a resulting clustering of a multi-node communication network utilizing efficient flooding with passive flooding (EFPC).

FIG. 4A illustrates a resulting clustering of a multi-node communication network utilizing efficient flooding with passive flooding (EFPC). In this regard, FIG. 4A illustrates a resulting clustering of the multi-node communication network depicted in FIG. 2A utilizing efficient flooding with passive flooding (EFPC) according to the state transition diagram depicted in FIG. 3.

Comparing the resulting clustering in FIG. 4A to the resulting clustering in FIG. 2C, it may be seen that both AODV and EFPC achieve the same resulting clustering when carried out in the multi-node communication network depicted in FIG. 2A, wherein Nodes 2, 6, 7, and 11 result in clusterhead nodes, and the remaining nodes result in gateway nodes. Thus, in the multi-node communication network depicted in FIG. 2A, EFPC results in no net gain and no net loss as compared to AODV routing protocols.

Figure 4B:
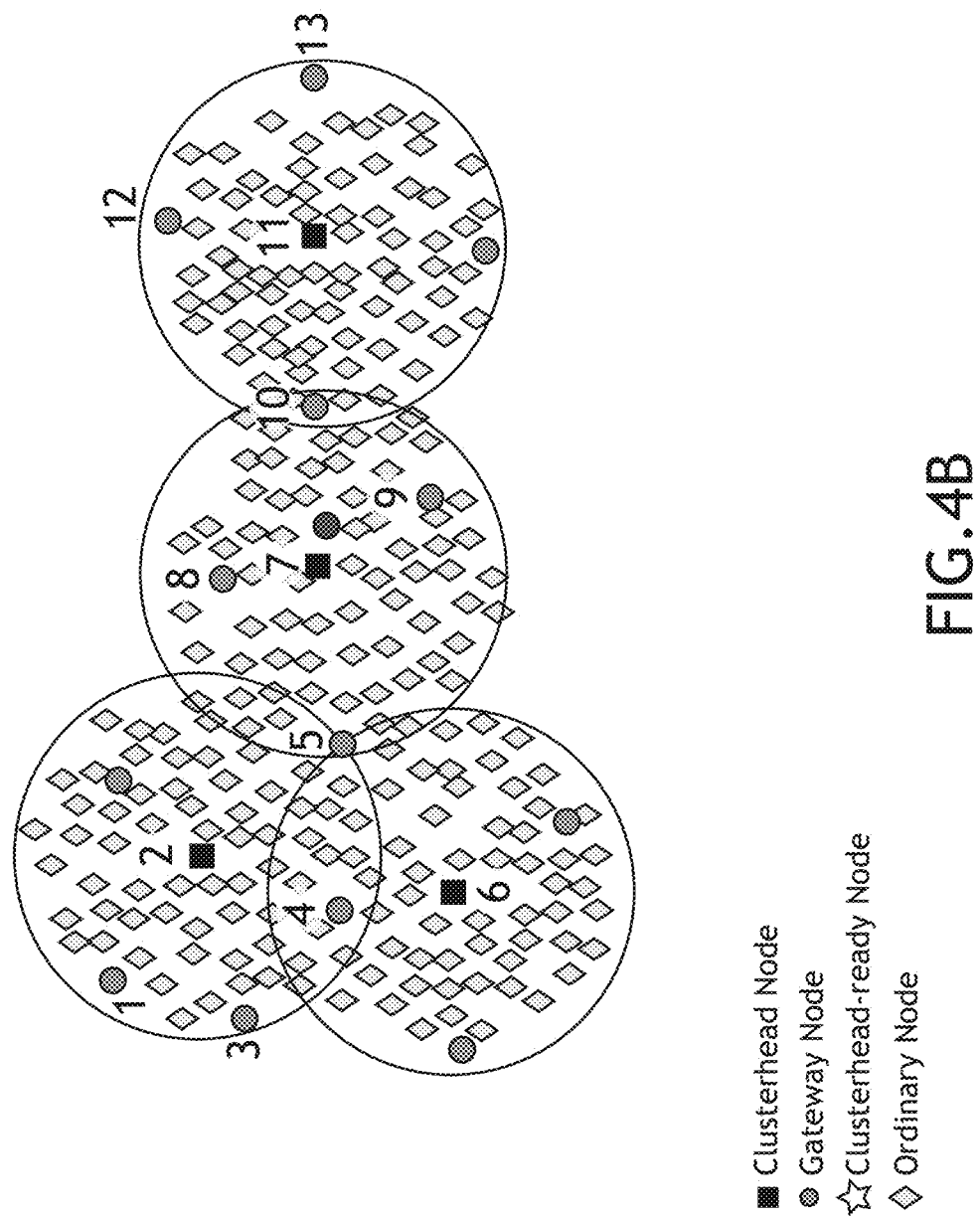
FIG. 4B illustrates a resulting clustering of a multi-node communication network utilizing efficient flooding with passive flooding (EFPC).

FIG. 4B illustrates a resulting clustering of a multi-node communication network utilizing efficient flooding with passive flooding (EFPC). In this regard, FIG. 4B illustrates a resulting clustering of a denser multi-node communication network utilizing efficient flooding with passive flooding (EFPC) according to the state transition diagram depicted in FIG. 3.

As may be seen in FIG. 4B, in a denser multi-node communication network, EFPC will result in a higher proportion of ordinary nodes to gateway nodes, and may thus result in increased overhead savings. It is contemplated herein that increasing density of a multi-node communication network may result in increasing savings utilizing EFPC.

Figure 5:
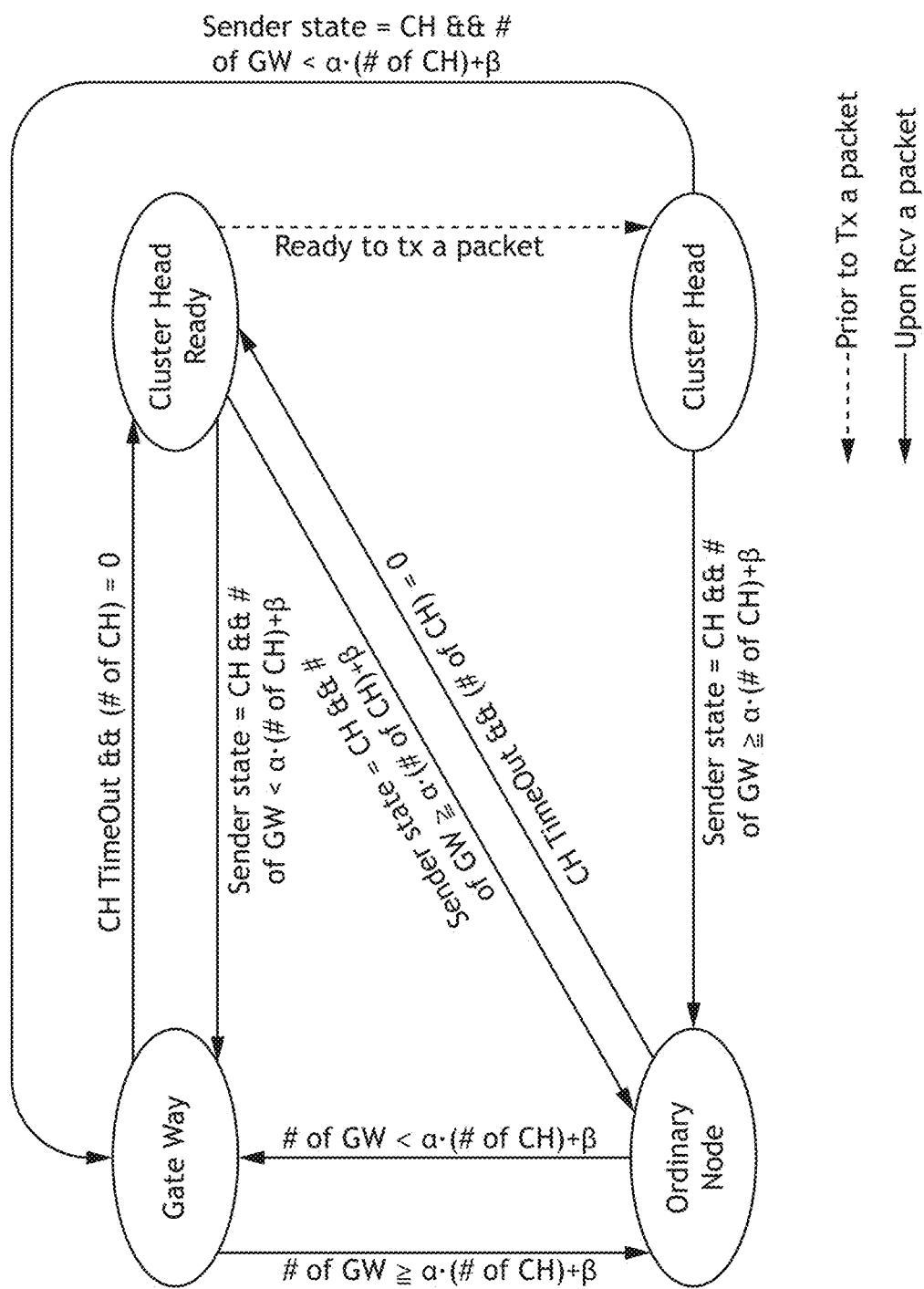
FIG. 5 illustrates a clustering state transition diagram for zero-overhead efficient flooding (ZOEF), in accordance with one or more embodiments of the present disclosure.

FIG. 5 illustrates a clustering state transition diagram for zero-overhead efficient flooding (ZOEF), in accordance with one or more embodiments of the present disclosure.

In some embodiments, as shown in FIG. 5, ZOEF may include four separate clustering statuses: an "ordinary node" clustering status, a "clusterhead-ready" clustering status, a "gateway node" clustering status, and a "clusterhead node" clustering status. As compared to EFPC in which each node may start out with an initial node clustering status, each node may start out with a clusterhead-ready clustering status under ZOEF.

In additional embodiments, upon receiving a data packet from a clusterhead node, an initial node may transition to a gateway node if $GW < \alpha*CH+\beta$. Additionally, upon receiving a data packet from a clusterhead node, a clusterhead-ready node may transition to an ordinary node if $GW \geq \alpha*CH+\beta$. Comparatively, upon receiving a data packet from a communication node other than a clusterhead node, a clusterhead-ready node may subsequently may declare its status as a clusterhead node and transition into a clusterhead node upon transmitting the data packet.

In embodiments, a clusterhead node may transition to a gateway node upon receiving a data packet from another clusterhead node if $GW < \alpha*CH+\beta$. Conversely, a clusterhead node may transition to an ordinary node upon receiving a data packet from another clusterhead node if $GW \geq \alpha*CH+\beta$. A gateway node may transition to an ordinary node upon receiving a data packet if the gateway node determines $GW \geq \alpha*CH+\beta$. Conversely, upon receiving a data packet, an ordinary node may transition to a gateway node if the ordinary node determines $GW < \alpha*CH+\beta$.

In some embodiments, ordinary nodes and gateway nodes may all revert back to clusterhead-ready nodes if all the clusterhead nodes within the local list of the respective nodes are timed-out. For example, a gateway node may revert back to a clusterhead-ready node if all the clusterhead nodes within the local list of the gateway node are timed-out.

It is noted herein that the state transition diagram for ZOEF depicted in FIG. 5 shares some similarities with the state transition diagram for EFPC depicted in FIG. 3. However, as will be described in further detail herein, these state transition differences between ZOEF and EFPC may result in similar or drastically different resulting clusterings, depending on the multi-node communication network at hand. As compared to EFPC, ZOEF may provide for passive clustering within waveforms which exhibit completely used headers. In this regard, ZOEF may be able to implement passive clustering even in waveforms which do not have to extra bits, as is required with EFPC.

Figure 6A:
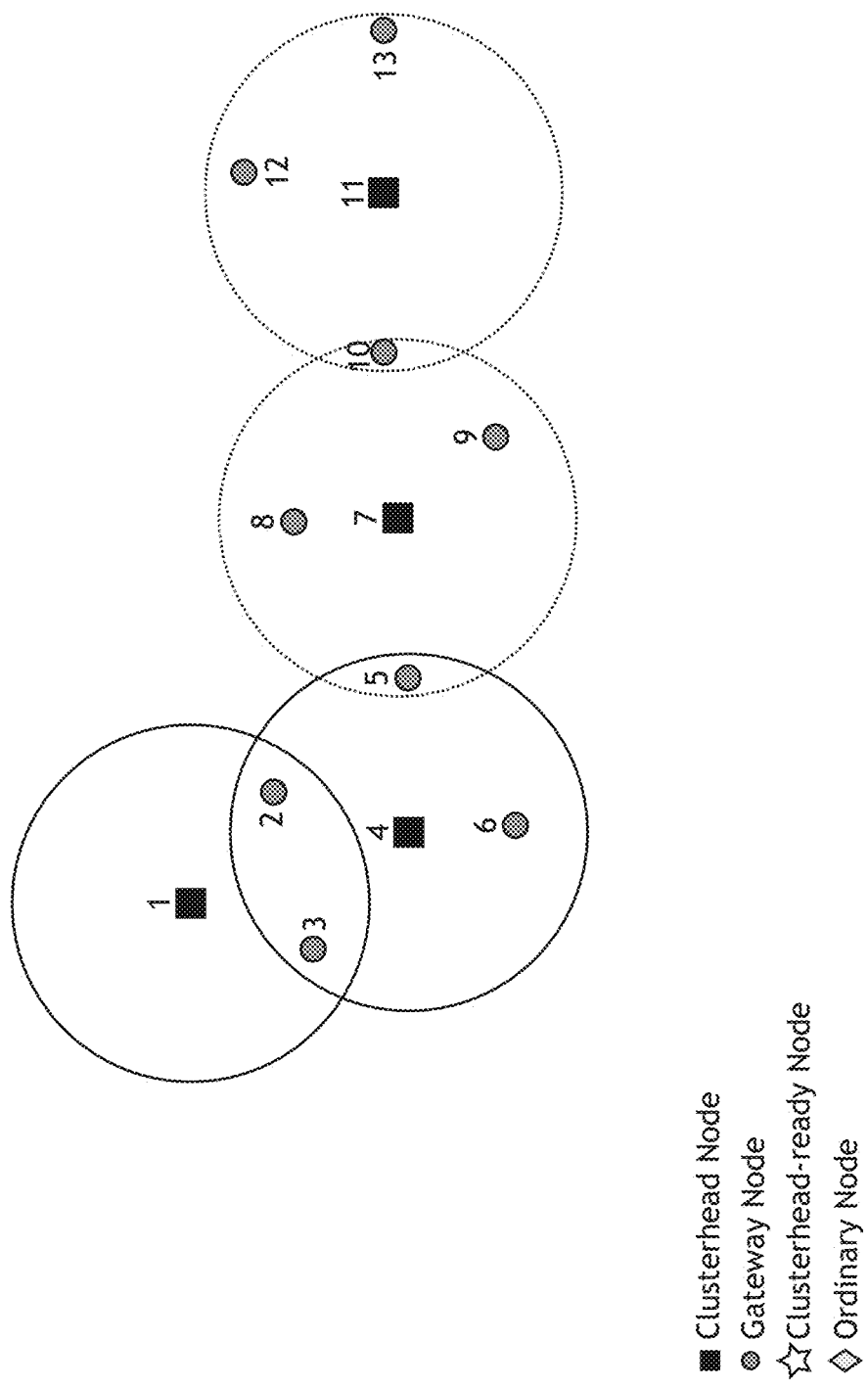
FIG. 6A illustrates a resulting clustering of a multi-node communication network utilizing zero-overhead efficient flooding (ZOEF), in accordance with one or more embodiments of the present disclosure.

FIG. 6A illustrates a resulting clustering of a multi-node communication network utilizing zero-overhead efficient flooding (ZOEF), in accordance with one or more embodiments of the present disclosure. In this regard, FIG. 6A illustrates a resulting clustering of the multi-node communication network depicted in FIG. 2A utilizing zero-overhead efficient flooding (ZOEF) according to the state transition diagram depicted in FIG. 5.

Comparing the resulting clustering in FIG. 6A to the resulting clusterings in FIGS. 2C and 4A it may be seen that ZOEF results in slightly different clustering as compared to AODV and EFPC. For example, under ZOEF, Node 1 results in a clusterhead node, whereas Node 1 results in a gateway node under both AODV and ZOEF.

Figure 6B:
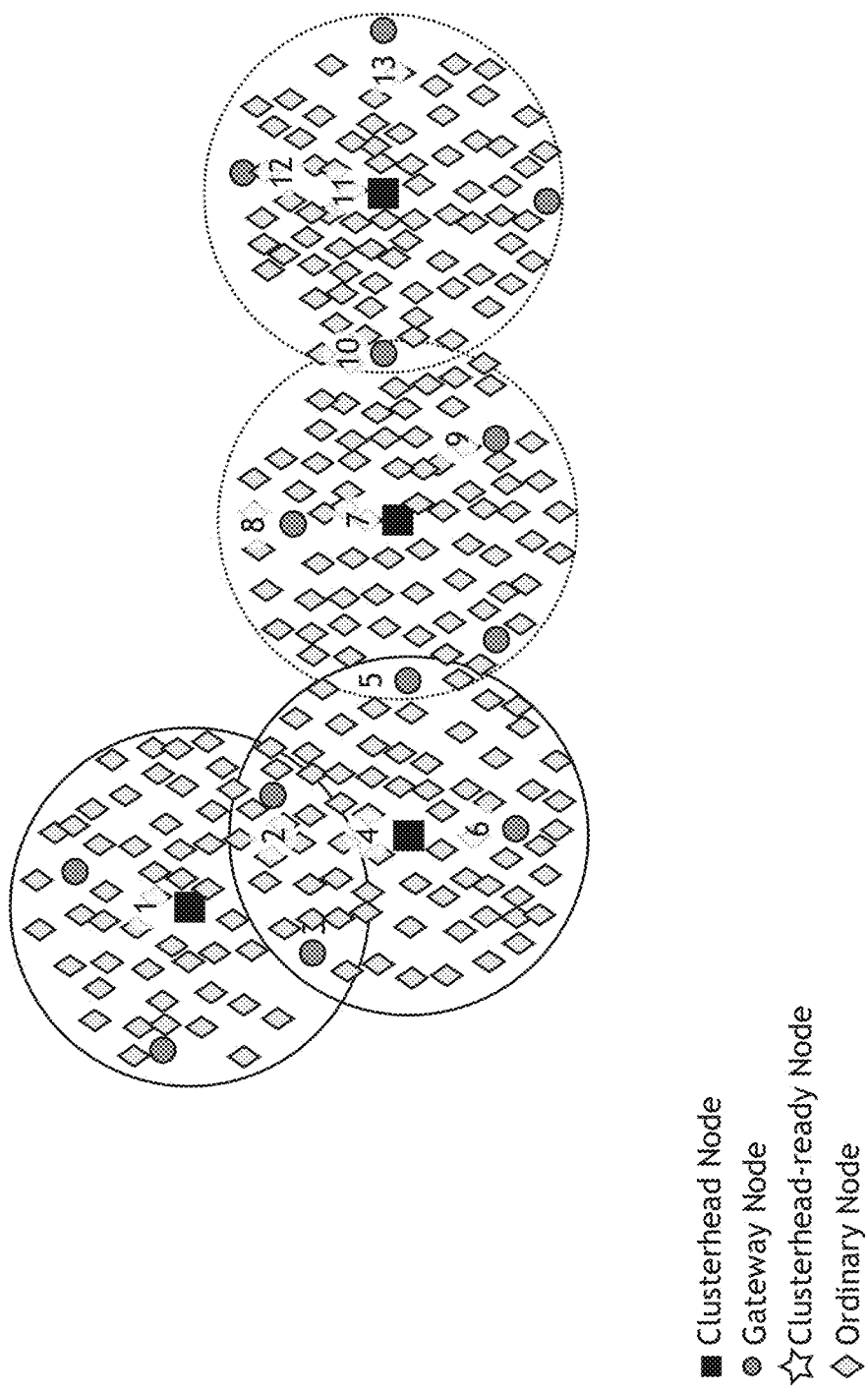
FIG. 6B illustrates a resulting clustering of a multi-node communication network utilizing zero-overhead efficient flooding (ZOEF), in accordance with one or more embodiments of the present disclosure.

FIG. 6B illustrates a resulting clustering of a multi-node communication network utilizing zero-overhead efficient flooding (ZOEF), in accordance with one or more embodiments of the present disclosure. In this regard, FIG. 6B illustrates a resulting clustering of a denser multi-node communication network utilizing zero-overhead efficient flooding (ZOEF) according to the state transition diagram depicted in FIG. 5.

As may be seen in FIG. 6B, in a denser multi-node communication network, ZOEF will result in a higher proportion of ordinary nodes to gateway nodes, and may thus result in increased overhead savings. Comparing the resulting clustering in FIG. 6B to the resulting clustering in FIG. 4B, it may be seen that ZOEF results in slightly different clustering as compared to EFPC.

It is further noted herein that the advantages of ZOEF may be most apparent in high density multi-node communication networks 100. As the density of a multi-node communication network 100 increases, the network overhead savings between embodiments of the present disclosure and previous approaches (e.g., AODV) increases. For example, as the density of a multi-node communication network 100 increases, the ratio of ordinary nodes (which do not participate in flooding) and gateway nodes increases, thereby reducing unnecessary data packet transmission and total network overhead. Furthermore, as compared to EFPC which requires two dedicated bits, ZOEF may provide for passive clustering and increased overhead savings in a multi-node communication network utilizing waveforms without two dedicated bits.

Figure 7:
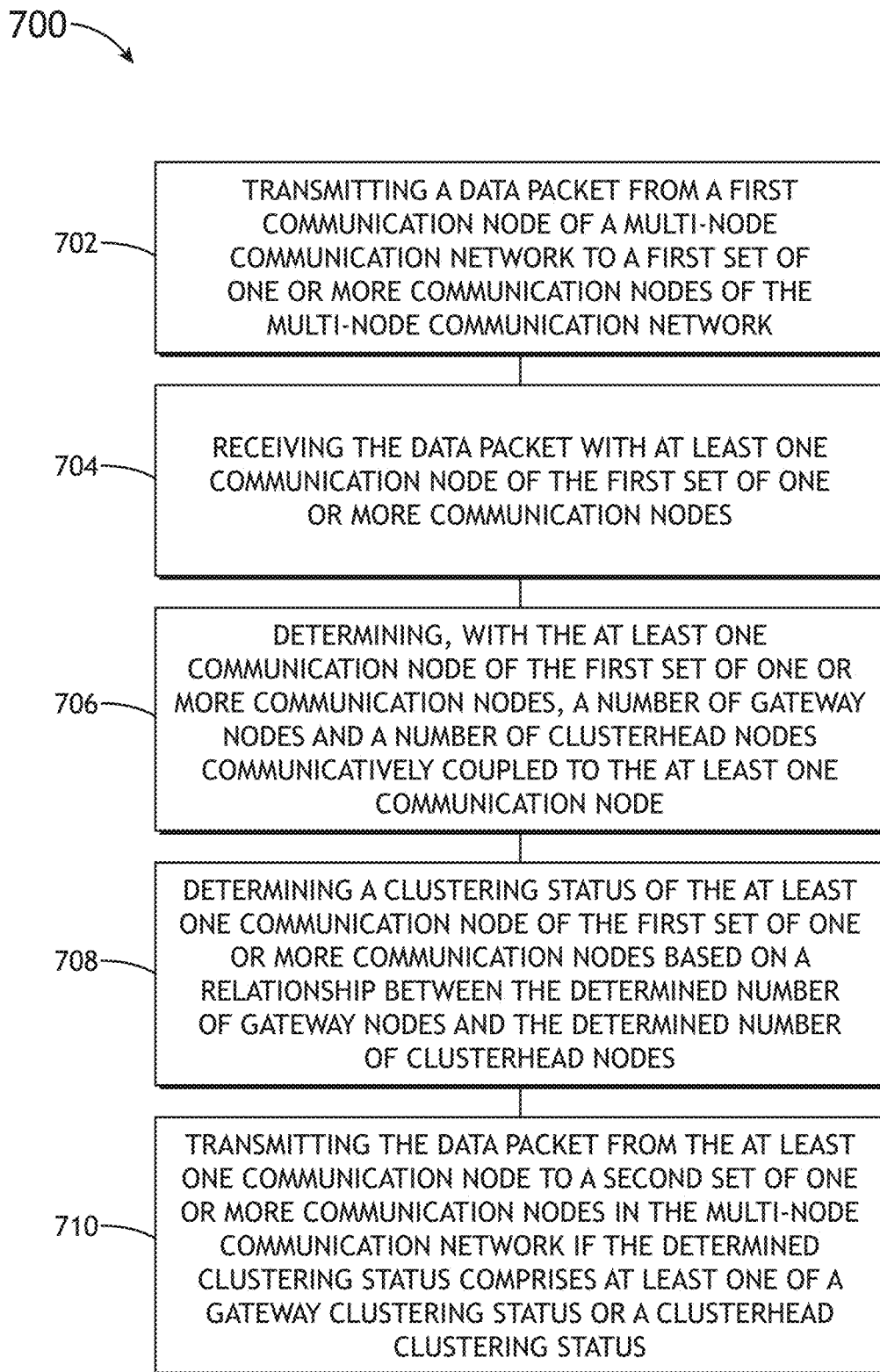
FIG. 7 illustrates a flowchart of a method for zero-overhead efficient flooding (ZOEF), in accordance with one or more embodiments of the present disclosure.

FIG. 7 illustrates a flowchart of a method 700 for zero-overhead efficient flooding (ZOEF), in accordance with one or more embodiments of the present disclosure. It is noted herein that the steps of method 700 may be implemented all or in part by multi-node communication network 100. It is further recognized, however, that the method 700 is not limited to the multi-node communication network 100 in that additional or alternative system-level embodiments may carry out all or part of the steps of method 700.

In a step 702, a data packet is transmitted from a first communication node of a multi-node communication network to a first set of one or more communication nodes of the multi-node communication network. In embodiments, the data packet may include a broadcast address indicative of a clustering status of the first communication node. For example, as shown in FIG. 4A, a first communication node 102a (Node 1) of a multi-node communication network 100 may transmit a data packet to a second communication node 102b (Node 2) and a third communication node 102c (Node 3), wherein the data packet includes a broadcast address indicative of the clustering status of the first communication node.

In embodiments, the data packet may include a single broadcast address indicative of the clustering status of the first communication node. Thus, passive clustering may be implemented through the use of individual broadcast addresses within the data packet. In embodiments, the single broadcast address in a data packet may include one of three separate broadcast addresses. For example, a first broadcast address may be indicative of a gateway node clustering status, a second broadcast address may be indicative of a clusterhead node clustering status, and a third broadcast address may be indicative of an ordinary node clustering status. For instance, a gateway node within the multi-node communication network 100 may transmit data packets including a single broadcast address indicative of a gateway node clustering status, a clusterhead node within the multi-node communication network 100 may transmit data packets including a single broadcast address indicative of a clusterhead node clustering status, and the like.

In a step 704, the data packet is received by at least one communication node of the first set of one or more communication nodes. For example, the second communication node 102*b* (Node 2) may receive the data packet from the first communication node 102*a* (Node 1).

In a step 706, the at least one communication node of the first set of communication nodes determines a number of gateway nodes and a number of clusterhead nodes communicatively coupled to the at least one communication node. For example, as noted previously herein, a communication node 102 of the multi-node communication network 100 may determine a number of gateway nodes and a number of clusterhead nodes communicatively coupled to the communication node 102 each time the communication node 102 receives a data packet from a gateway node or a clusterhead node. In embodiments, a communication network 100 may determine a number of gateway nodes and a number of clusterhead nodes communicatively coupled to the communication node 102 by referencing a local list stored in the memory 106 of the communication node 102.

In a step 708, the at least one communication node of the first set of communication nodes determines a clustering status of the at least one communication node based on a relationship between the determined number of gateway nodes and the determined number of clusterhead nodes. For example, as shown in FIG. 41, Node 4 (e.g., communication node 102*d*) may determine a clustering status of Node 4 based on a relationship between the determined number of gateway nodes and the determined number of clusterhead nodes communicatively coupled to Node 4. In embodiments, if Equation 1 is found to be true, the controller 104*d* may be configured to determine the clustering status of Node 4 to be an ordinary node clustering status. Conversely, if Equation 2 is found to be true, a controller 104*d* may be configured to determine the clustering status of Node 4 to be a gateway node clustering status.

In a step 710, a data packet is transmitted from the at least one communication node to a second set of one or more communication nodes if the determined clustering status of the at least one communication node includes a gateway clustering status or a clusterhead clustering status. In embodiments, the data packet may include a single broadcast address indicative of the clustering status of the first communication node. In additional embodiments, a communication node 102 may refrain from participating in flooding (e.g., not transmit the data packet) if the determined clustering status of the communication node 102 is an ordinary node clustering status.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A communication node of a multi-node communication network, the communication node comprising:
    a communication interface; and
    a controller communicatively coupled to the communication interface, the controller configured to:
        receive a data packet, via the communication interface, from a first additional communication node of the multi-node communication network, the data packet including a broadcast address indicative of a clustering status of the first additional communication node;
    determine a clustering status of the communication node, the clustering status based on a relationship between a number of gateway nodes and a number of clusterhead nodes communicatively coupled to the communication node, wherein determining the clustering status of the communication node comprises:
        determining an ordinary node clustering status if $GW \geq \alpha*CH+\beta$, and
        determining a gateway node clustering status if $GW < \alpha*CH+\beta$,
        wherein GW defines the number of gateway nodes communicatively coupled to the communication node, CH defines the number of clusterhead nodes communicatively coupled to the clusterhead node, and a and define gateway redundancy factors; and
        transmit the data packet, via the communication interface, to at least a second additional communication node of the multi-node communication network if the determined clustering status is a gateway clustering status or a clusterhead clustering status, the data packet including a broadcast address indicative of the clustering status of the communication node.

2. The communication node of claim 1, wherein the controller is further configured to:
    refrain from transmitting the data packet if the determined clustering status includes an ordinary node clustering status.

3. The communication node of claim 1, wherein the controller is further configured to:
    determine the number of gateway nodes and the number of clusterhead nodes communicatively coupled to the communication node.

4. The communication node of claim 1, wherein at least one of the broadcast address indicative of the clustering status of the first additional communication node or the broadcast address indicative of the clustering status of the communication node comprises:
    a single address of a total address space of the data packet.

5. The communication node of claim 1, wherein at least one of the broadcast address indicative of the clustering status of the first additional communication node or the broadcast address indicative of the clustering status of the communication node comprises at least one of:
 a first broadcast address indicative of a gateway node clustering status;
 a second broadcast address indicative of a clusterhead node clustering status; or
 a third broadcast address indicative of an ordinary node clustering status.

6. The communication node of claim 1, further including a memory configured to store a local list of one or more communication nodes communicatively coupled to the communication node.

7. The communication node of claim 6, wherein determining a clustering status of the communication node, the clustering status based on a relationship between a number of gateway nodes and a number of clusterhead nodes communicatively coupled to the communication node comprises:
 counting a number of gateway nodes within the local list, and counting a number of clusterhead nodes within the local list.

8. The communication node of claim 6, wherein the controller is further configured to:
 identify the first additional communication node based on a unique identifier of the first additional communication node received with the data packet from the first additional communication node;
 determine whether the first additional communication node is present within the local list stored in the memory;
 add the first additional communication node to the local list if the first additional communication node is not present within the local list; and
 update a clustering status and a communication time-stamp of the first additional communication node within the local list if the first additional communication node is present within the local list, wherein updating the communication time-stamp includes updating the communication time-stamp to a current time.

9. The communication node of claim 8, wherein the unique identifier includes at least one of a media access control (MAC) address or an internet protocol (IP) address.

10. The communication node of claim 6, wherein the controller is further configured to:
 identify one or more timed-out communication nodes within the local list, and remove the one or more identified timed-out communication nodes from the local list.

11. A method for transmitting data, comprising:
 transmitting a data packet from a first communication node of a multi-node communication network to a first set of one or more communication nodes of the multi-node communication network, the data packet including a broadcast address indicative of a clustering status of the first communication node;
 receiving the data packet with at least one communication node of the first set of one or more communication nodes;
 determining a clustering status of the at least one communication node of the first set of one or more communication nodes based on a relationship between a number of gateway nodes and a number of clusterhead nodes communicatively coupled to the at least one communication node of the first set of communication nodes, wherein determining the clustering status of the communication node comprises:
 determining an ordinary node clustering status if $GW \geq \alpha*CH+\beta$, and
 determining a gateway node clustering status if $GW < \alpha*CH+\beta$,
 wherein GW defines the number of gateway nodes communicatively coupled to the communication node, CH defines the number of clusterhead nodes communicatively coupled to the clusterhead node, and $\alpha$ and $\beta$ define gateway redundancy factors; and
 transmitting the data packet from the at least one communication node of the first set of communication nodes to a second set of one or more communication nodes in the multi-node communication network if the determined clustering status comprises a gateway clustering status or a clusterhead clustering status, the data packet including a broadcast address indicative of a clustering status of the at least one communication node of the first set of communication nodes.

12. The method of claim 11, wherein at least one of the data packet transmitted from the first communication node to the first set of one or more communication nodes or the data packet transmitted from the at least one communication node of the first set of one or more communication nodes to the second set of one or more communication nodes comprises:
 a single broadcast address of a total address space of the data packet.

13. The method of claim 11, wherein at least one of the broadcast address indicative of the clustering status of the first additional communication node or the broadcast address indicative of the clustering status of the communication node comprises at least one of:
 a first broadcast address indicative of a gateway node clustering status;
 a second broadcast address indicative of a clusterhead node clustering status; or
 a third broadcast address indicative of an ordinary node clustering status.

14. The method of claim 11, wherein determining a clustering status of the at least one communication node of the first set of one or more communication nodes based on a relationship between a number of gateway nodes and a number of clusterhead nodes communicatively coupled to the at least one communication node of the first set of communication nodes; comprises:
 counting a number of gateway nodes within a local list stored in a memory of the at least one communication node, the local list including a list of communication nodes communicatively coupled to the at least one communication node; and
 counting a number of clusterhead nodes within the local list.

15. The method of claim 14, further comprising:
 identifying one or more timed-out communication nodes including within the local list; and
 removing the one or more identified timed-out communication nodes from the local list.

16. The method of claim 11, further comprising
 identifying the first communication node based on a unique identifier of the first communication node received with the data packet;
 determining whether the first communication node is present within a local list stored in a memory of the at least one communication node, the local list including a list of communication nodes communicatively coupled to the at least one communication node;

adding the first communication node to the local list if the first communication node is not present within the local list; and updating a clustering status and a communication time-stamp of the first communication node if the first communication node is present within the local list, wherein updating the communication time-stamp includes updating the communication time-stamp to a current time.

17. The communication node of claim 16, wherein the unique identifier includes at least one of a media access control (MAC) address or an internet protocol (IP) address.

\* \* \* \* \*